United States Patent
Landon et al.

(10) Patent No.: US 7,625,976 B2
(45) Date of Patent: *Dec. 1, 2009

(54) ROOM TEMPERATURE CURABLE ORGANOPOLYSILOXANE COMPOSITION

(75) Inventors: Shayne J. Landon, Ballston Lake, NY (US); David A. Williams, Ganesvoort, NY (US); Vikram Kumar, Bangalore (IN); Edward J. Nesakumar, Bangalore (IN); Indumathi Ramakrishnan, Bangalore (IN)

(73) Assignee: Momemtive Performance Materials Inc., Albany, NY (US)

( * ) Notice: Subject to any disclaimer, the term of this patent is extended or adjusted under 35 U.S.C. 154(b) by 333 days.

This patent is subject to a terminal disclaimer.

(21) Appl. No.: 11/327,894

(22) Filed: Jan. 9, 2006

(65) Prior Publication Data

US 2007/0173596 A1 Jul. 26, 2007

(51) Int. Cl.
*C08L 83/04* (2006.01)

(52) U.S. Cl. .................. 524/588; 524/445; 524/447; 524/448; 525/100; 525/104; 525/393; 525/431; 525/446; 525/464; 528/34

(58) Field of Classification Search .................. None
See application file for complete search history.

(56) References Cited

U.S. PATENT DOCUMENTS

| | | | |
|---|---|---|---|
| 4,131,589 A | 12/1978 | Smith, Jr. | |
| 4,699,940 A | 10/1987 | Gerace et al. | |
| 4,710,411 A | 12/1987 | Gerace et al. | |
| 4,983,418 A * | 1/1991 | Murphy et al. | 424/47 |
| 5,051,311 A * | 9/1991 | Popa et al. | 428/447 |
| 5,576,054 A | 11/1996 | Brown | |
| 5,653,073 A | 8/1997 | Palmer | |
| 5,849,832 A | 12/1998 | Virnelson et al. | |
| 5,855,972 A | 1/1999 | Kaeding | |
| 6,055,783 A | 5/2000 | Guhl et al. | |
| 6,238,755 B1 | 5/2001 | Harvey et al. | |
| 6,301,858 B1 | 10/2001 | Crandell | |
| 6,445,158 B1 | 9/2002 | Bertness et al. | |
| 6,457,294 B1 | 10/2002 | Virnelson et al. | |
| 6,686,002 B2 | 2/2004 | Auerbach et al. | |
| 6,713,547 B2 | 3/2004 | Barbee et al. | |
| 6,796,102 B2 | 9/2004 | Virnelson et al. | |
| 6,797,760 B1 | 9/2004 | Ebrahimian et al. | |
| 6,803,412 B2 | 10/2004 | Nguyen-Misra et al. | |
| 6,812,272 B2 | 11/2004 | Fischer | |
| 6,822,035 B2 | 11/2004 | Chaiko | |
| 6,889,480 B2 | 5/2005 | Guhl et al. | |
| 2002/0091186 A1 | 7/2002 | Auerbach | |
| 2002/0119266 A1 | 8/2002 | Bagrodia et al. | |
| 2002/0194813 A1 | 12/2002 | Virnelson et al. | |
| 2004/0127629 A1 | 7/2004 | Jacob et al. | |
| 2004/0149370 A1 | 8/2004 | Auerbach | |
| 2004/0180154 A1 | 9/2004 | Wang et al. | |
| 2004/0180155 A1 | 9/2004 | Nguyen-Misra | |
| 2004/0258628 A1 * | 12/2004 | Riedel et al. | 424/47 |
| 2005/0113498 A1 | 5/2005 | Auerbach | |
| 2005/0192387 A1 | 9/2005 | Williams et al. | |
| 2005/0203235 A1 | 9/2005 | Gong et al. | |
| 2005/0249033 A1 | 11/2005 | Krause | |
| 2007/0117926 A1 * | 5/2007 | Landon et al. | 525/106 |
| 2007/0173597 A1 * | 7/2007 | Williams et al. | 524/588 |

FOREIGN PATENT DOCUMENTS

| | | |
|---|---|---|
| DE | 4136689 | 5/1992 |
| EP | 0220809 A2 | 5/1987 |
| EP | 0520777 | 12/1992 |
| EP | 0857761 | 8/1998 |
| EP | 0994151 A1 | 3/2006 |
| GB | 2249552 | 5/1992 |
| WO | WO 97/31057 | 8/1997 |
| WO | WO99/45072 | 9/1999 |
| WO | WO 02064676 | 8/2002 |

OTHER PUBLICATIONS

Peter C. LeBaron et al., "Clay Nanolayer Reinforcement of a Silicone Elastomer", 2001.
Shelly D. Burnside et al., "Nanostructure and Properties of Polysiloxane-Layered Silicate Nanocomposites", Mar. 28, 2000.
K. Mizoguchi et al., "Miscibility and gas permeability of poly (ethylene-co-5,4 mol% 3,5,5-trimethylhexyl methacrylate)-polydimethyl-siloxane blends", 1997.
Y. Geerts et al., "Morphology and Permeability of Polymer Blends-I. Crosslinked EPDM-Silicone Blends", 1996.

* cited by examiner

*Primary Examiner*—Marc S Zimmer
(74) *Attorney, Agent, or Firm*—Dominick G. Vicari

(57) ABSTRACT

This invention relates to a room temperature curable composition containing, inter alia, diorganopolysiloxane(s) and organic nanoclay(s), the cured composition exhibiting low permeability to gas(es).

25 Claims, 1 Drawing Sheet

ROOM TEMPERATURE CURABLE ORGANOPOLYSILOXANE COMPOSITION

FIELD OF THE INVENTION

This invention relates to a room temperature curable composition exhibiting, when cured, low permeability to gas(es).

BACKGROUND OF THE INVENTION

Room temperature curable (RTC) compositions are well known for their use as sealants. In the manufacture of Insulating Glass Units (IGU), for example, panels of glass are placed parallel to each other and sealed at their periphery such that the space between the panels, or the inner space, is completely enclosed. The inner space is typically filled with a gas or mixture of gases of low thermal conductivity, e.g. argon. Current room temperature curable silicone sealant compositions, while effective to some extent, still have only a limited ability to prevent the loss of insulating gas from the inner space of an IGU. Over time, the gas will escape reducing the thermal insulation effectiveness of the IGU to the vanishing point.

A need therefore exists for an RTC composition of reduced gas permeability compared to that of known RTC compositions. When employed as the sealant for an IGU, an RTC composition of reduced gas permeability will retain the intrapanel insulating gas for a longer period of time compared to that of a more permeable RTC composition and will therefore extend the insulating properties of the IGU over a longer period of time.

SUMMARY OF THE INVENTION

The present invention is based on the discovery that curable silanol-terminated diorganopolysiloxane combined with filler of a certain type upon curing exhibits reduced permeability to gas. The composition is especially suitable for use as a sealant where high gas barrier properties together with the desired characteristics of softness, processability and elasticity are important performance criteria.

In accordance with the present invention, there is provided a curable composition comprising:
  a) at least one silanol-terminated diorganopolysiloxane;
  b) at least one crosslinker for the silanol-terminated diorganopolysiloxane(s);
  c) at least one catalyst for the crosslinking reaction;
  d) at least one organic nanoclay; and, optionally,
  e) at least one solid polymer having a permeability to gas that is less than the permeability of the crosslinked diorganopolysiloxane(s).

When used as a gas barrier, e.g., in the manufacture of an IGU, the foregoing composition reduces the loss of gas(es) thus providing a longer service life of the article in which it is employed.

DETAILED DESCRIPTION OF THE INVENTION

Figure 1:
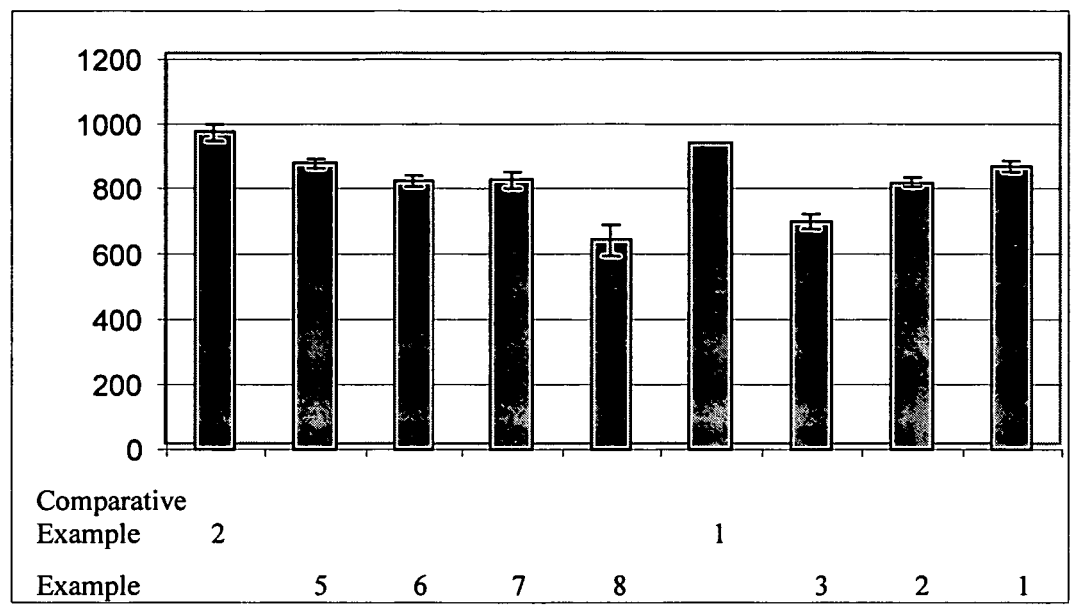
FIG. 1 is a graphic presentation of permeability data for the sealant compositions of Comparative Examples 1-2 and Examples 1-3 and 5-8.

The curable sealant composition of the present invention is obtained by mixing (a) at least one diorganopolysiloxane, (b) at least one crosslinker for the diorganopolysiloxane(s), (c) at least one catalyst for the crosslinking reaction, (d) at least one organic nanoclay and, optionally, (e) at least one solid polymer having a permeability to gas that is less than the permeability of the crosslinked diorganopolysiloxane(s), the composition following curing exhibiting low permeability to gas (es).

The compositions of the invention are useful for the manufacture of sealants, coatings, adhesives, gaskets, and the like, and are particularly suitable for use in sealants intended for insulating glass units.

The viscosity of the silanol-terminated diorganopolysiloxane that is employed in the curable composition of the invention can vary widely and advantageously ranges from about 1,000 to about 200,000 cps at 25° C.

Suitable silanol-terminated diorganopolysiloxanes (a) include those of the general formula:

$$M_a D_b D'_c$$

wherein "a" is 2, and "b" is equal to or greater than 1 and "c" is zero or positive; M is $$(HO)_{3-x-y}R^1{}_x R^2{}_y SiO_{1/2}$$

wherein "x" is 0, 1 or 2 and "y" is either 0 or 1, subject to the limitation that x+y is less than or is equal to 2, $R^1$ and $R^2$ each independently is a monovalent hydrocarbon group up to 60 carbon atoms; D is $$R^3 R^4 SiO_{2/2}$$

wherein $R^3$ and $R^4$ each independently is a monovalent hydrocarbon group up to 60 carbon atoms; and D' is $$R^5 R^6 SiO_{2/2}$$

wherein $R^5$ and $R^6$ each independently is a monovalent hydrocarbon group up to 60 carbon atoms.

Suitable crosslinkers (b) for the silanol-terminated diorganopolysiloxane(s) present in the composition of the invention include alkylsilicates of the general formula:

$$(R^{14}O)(R^{15}O)(R^{16}O)(R^{17}O)Si$$

wherein $R^{14}$, $R^{15}$, $R^{16}$ and $R^{17}$ each independently is a monovalent hydrocarbon group up to 60 carbon atoms. Crosslinkers of this type include, n-propyl silicate, tetraethylortho silicate and methyltrimethoxysilane and similar alkyl-substituted alkoxysilane compounds, and the like.

Suitable catalysts (c) for the crosslinking reaction of the silanol-terminated diorganopolysiloxane(s) can be any of those known to be useful for facilitating the crosslinking of such siloxanes. The catalyst can be a metal-containing or non-metallic compound. Examples of useful metal-containing compounds include those of tin, titanium, zirconium, lead, iron cobalt, antimony, manganese, bismuth and zinc.

In one embodiment of the present invention, tin-containing compounds useful as crosslinking catalysts include: dibutyltindilaurate, dibutyltindiacetate, dibutyltindimethoxide, tinoctoate, isobutyltintriceroate, dibutyltinoxide, soluble dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates, and the like. Useful titanium-containing catalysts include: chelated titanium compounds, e.g., 1,3-propanedioxytitanium bis(ethylacetoacetate), di-isopropoxytitanium bis(ethylacetoacetate), and tetraalkyl titanates, e.g., tetra n-butyl titanate and tetra-isopropyl titanate. In yet another embodiment of the present invention, diorganotin bis β-diketonates is used for facilitating crosslinking in silicone sealant composition.

The curable composition of the present invention includes at least one organic nanoclay filler (d). Nanoclays possess a unique morphology with one dimension being in the nanometer range. The nanoclays can form chemical complexes with an intercalant that ionically bonds to surfaces in between the layers making up the clay particles. This association of intercalant and clay particles results in a material which is compatible with many different kinds of host resins permitting the clay filler to disperse therein.

The term "exfoliation" as used herein describes a process wherein packets of nanoclay platelets separate from one another in a polymer matrix. During exfoliation, platelets at the outermost region of each packet cleave off, exposing more platelets for separation.

The term "gallery" as used herein describes the space between parallel layers of clay platelets. The gallery spacing changes depending on the nature of the molecule or polymer occupying the space. An interlayer space between individual nanoclay platelets varies, again depending on the type of molecules that occupy the space.

The term "intercalant" as used herein includes any inorganic or organic compound that is capable of entering the clay gallery and bonding to its surface.

The term "intercalate" as used herein designates a clay-chemical complex wherein the clay gallery spacing has increased due to the process of surface modification. Under the proper conditions of temperature and shear, an intercalate is capable of exfoliating in a resin matrix.

The expression "low permeability to gas(es)" as applied to the cured composition of this invention shall be understood to mean an argon permeability coefficient of not greater than about 900 barrers (1 barrer=$10^{-10}$ (STP)/cm sec(cmHg)) measured in accordance with the constant pressure variable-volume method at a pressure of 100 psi and temperature of 25° C.

The expression "modified clay" as used herein designates a clay material that has been treated with any inorganic or organic compound that is capable of undergoing ion exchange reactions with the cations present at the interlayer surfaces of the clay.

The term "nanoclay" as used herein describes clay materials that possess a unique morphology with one dimension being in the nanometer range. Nanoclays can form chemical complexes with an intercalant that ionically bonds to surfaces in between the layers making up the clay particles. This association of intercalant and clay particles results in a material which is compatible with many different kinds of host resins permitting the clay filler to disperse therein.

The expression "organic nanoclay" as use herein describes a nanoclay that has been treated or modified with an organic intercalant.

The term "organoclay" as used herein designates a clay or other layered material that has been treated with organic molecules (variously referred to as "exfoliating agents," "surface modifiers" or "intercalants") that are capable of undergoing ion exchange reactions with the cations present at the interlayer surfaces of the clay.

The nanoclays can be natural or synthetic materials. This distinction can influence the particle size and for this invention, the particles should have a lateral dimension of between about 0.01 μm and about 5 μm, and preferably between about 0.05 μm and about 2 μm, and more preferably between about 0.1 μm and about 1 μm. The thickness or the vertical dimension of the particles can in general vary between about 0.5 nm and about 10 nm and preferably between about 1 nm and about 5 nm.

Useful nanoclays for providing the organic nanoclay filler component of the composition of the invention include natural or synthetic phyllosilicates, particularly smectic clays such as montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, talc, mica, kaolinite, vermiculite, halloysite, aluminate oxides, or hydrotalcites, and the like, and their mixtures. In another embodiment, useful nanoclays include micaceous minerals such as illite and mixed layered illite/smectite minerals such as rectorite, tarosovite, ledikite and admixtures of illites with one or more of the clay minerals named above. Any swellable layered material that sufficiently sorbs the organic molecules to increase the interlayer spacing between adjacent phyllosilicate platelets to at least about 5 angstroms, or to at least about 10 angstroms, (when the phyllosilicate is measured dry) can be used in producing the filler component to provide the curable composition of the invention.

In one embodiment of the present invention, organic compounds that are useful for treating nanoclays and layered materials to provide the filler component herein include cationic surfactants such as ammonium, ammonium chloride, alkylammonium (primary, secondary, tertiary and quaternary), phosphonium or sulfonium derivatives of aliphatic, aromatic or arylaliphatic amines, phosphines or sulfides.

Other organic treating agents for nanoclays that can be used herein include amine compounds and/or quaternary ammonium compounds $R^6R^7R^8N^+X^-$ each independently is an alkoxy silane group, alkyl group or alkenyl group of up to 60 carbon atoms and X is an anion such as $Cl^-$, $F^-$, $SO_4^-$, etc.

Optionally, the curable composition herein can also contain at least one solid polymer (e) having a permeability to gas that is less than the permeability of the crosslinked diorganopolysiloxane. Suitable polymers include polyethylenes such as low density polyethylene (LDPE), very low density polyethylene (VLDPE), linear low density polyethylene (LLDPE) and high density polyethylene (HDPE); polypropylene (PP), polyisobutylene (PIB), polyvinyl acetate(PVAc), polyvinyl alcohol (PVoH), polystyrene, polycarbonate, polyester, such as, polyethylene terephthalate (PET), polybutylene terephthalate (PBT), polyethylene napthalate (PEN), glycol-modified polyethylene terephthalate (PETG); polyvinylchloride (PVC), polyvinylidene chloride, polyvinylidene floride, thermoplastic polyurethane (TPU), acrylonitrile butadiene styrene (ABS), polymethylmethacrylate (PMMA), polyvinyl fluoride (PVF), Polyamides (nylons), polymethylpentene, polyimide (PI), polyetherimide (PEI), polether ether ketone (PEEK), polysulfone , polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), and the like and mixture thereof.

The optional polymer(s) can also be elastomeric in nature, examples include, but are not limited to ethylene- propylene rubber (EPDM), polybutadiene, polychloroprene, polyisoprene, polyurethane (TPU), styrene-butadiene-styrene (SBS), styrene-ethylene-butadiene-styrene (SEEBS), polymethylphenyl siloxane (PMPS), and the like.

These optional polymers can be blended either alone or in combinations or in the form of coplymers, e.g. polycarbonate-ABS blends, polycarbonate polyester blends, grafted polymers such as, silane grafted polyethylenes, and silane grafted polyurethanes.

In one embodiment of the present invention, the curable composition contains a polymer selected from the group consisting of low density polyethylene (LDPE), very low density polyethylene (VLDPE), linear low density polyethylene (LLDPE), high density polyethylene (HDPE), and mixtures thereof. In another embodiment of the invention, the curable composition has a polymer selected from the group consisting of low density polyethylene (LDPE), very low density polyethylene (VLDPE), linear low density polyethylene (LLDPE), and mixture thereof. In yet another embodiment of the present invention, the optional polymer is a linear low density polyethylene (LLDPE).

The curable composition can contain one or more other fillers in addition to organic nanoclay component (d). Suitable additional fillers for use herein include precipitated and colloidal calcium carbonates which have been treated with compounds such as stearic acid or stearate ester; reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black, graphite, mica, talc, and the like, and mixtures thereof.

The curable composition of the present invention can also include one or more alkoxysilanes as adhesion promoters. Useful adhesion promoters include N-2-aminoethyl-3-aminopropyltriethoxysilane, γ-aminopropyltriethoxysilane, γ-aminopropyltrimethoxysilane, aminopropyltrimethoxysilane, bis-γ-trimethoxysilypropyl)amine, N-phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, and N-ethyl-3-trimethoxysilyl-2-methylpropanamine, and the like. In one embodiment, the adhesion promoter can be a combination of n-2-aminoethyl-3-aminopropyltrimethoxysilane and 1,3,5-tris(trimethoxysilylpropyl)isocyanurate.

The compositions of the present invention can also include one or more non-ionic surfactants such as polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof.

The curable compositions of the present invention can include still other ingredients that are conventionally employed in RTC silicone-containing compositions such as colorants, pigments, plasticizers, antioxidants, UV stabilizers, biocides, etc., in known and conventional amounts provided they do not interfere with the properties desired for the cured compositions.

The amounts of silanol-terminated diorganopolysiloxane (s), crosslinker(s), crosslinking catalyst(s), oranic nanoclay (s), optional solid polymers(s) of lower gas permeability than the crosslinked diorganopolysiloxane(s), optional filler(s) other than organic nanoclay, optional adhesion promoter(s) and optional ionic surfactant(s) can vary widely and, advantageously, can be selected from among the ranges indicated in the following table.

TABLE 1

Ranges of Amounts (Weight Percent) of Components of the Curable Composition of the Invention

| Components of the Curable Composition | First Range | Second Range | Third Range |
| --- | --- | --- | --- |
| Silanol-terminated Diorganopolysiloxane(s) | 50-99 | 70-99 | 80-85 |
| Crosslinker(s) | 0.1-10 | 0.3-5 | 0.5-1.5 |
| Crosslinking Catalyst(s) | 0.001-1 | 0.003-0.5 | 0.005-0.2 |
| Organic Nanoclay(s) | 0.1-50 | 10-30 | 15-20 |
| Solid Polymer(s) of Lower Gas Permeability than Crosslinked Dioganopoly-Siloxane(s) | 0-50 | 5-40 | 10-35 |
| Filler(s) other than Organic Nanoclay | 0-90 | 5-60 | 10-40 |
| Silane Adhesion Promoter(s) | 0-20 | 0.1-10 | 0.5-2 |
| Ionic Surfactant(s) | 0-10 | 0.1-5 | 0.5-0.75 |

The curable compositions herein can be obtained by procedures that are well known in the art, e.g., melt blending, extrusion blending, solution blending, dry mixing, blending in a Banbury mixer, etc., in the presence of moisture to provide a substantially homogeneous mixture.

Preferably, the methods of blending the diorganopolysiloxane polymers with polymers may be accomplished by contacting the components in a tumbler or other physical blending means, followed by melt blending in an extruder. Alternatively, the components can be melt blended directly in an extruder, Brabender or any other melt blending means.

The invention is illustrated by the following non-limiting examples.

COMPARATIVE EXAMPLE 1 AND EXAMPLES 1-4

A mixture of silanol-terminated polydimethylsiloxanes (PDMS), specifically, Silanol 5000, a silanol-terminated polydimethylsiloxane of 5000 cs nominal and Silanol 50,000, a silanol-terminated polydimethylsiloxane of 50,000 cs nominal, both available from Gelest, Inc., were mixed in a 100 ml cup with Cloisite 15A ("C-15A," a montmorillonite clay modified with 125 milliequivalants of dimethyl dehydrogenated tallow ammonium chloride per 100 g of clay available from Southern Clay Products) or SF ME100 (a synthetic fluorohectorite having the general formula $NaMg_{2.5}Si_4O_{10}(F_\alpha OH_{1-\alpha})_2$ ($0.8<=\alpha<=1.0$) available from Unicorp, Japan) employing a hand blender for 10-15 minutes and thereafter placed in a vacuum dessicator for 5 minutes to remove air bubbles generated during mixing. Blends were made with the amounts of nanoclay ranging from 1 to 10 weight percent.

Following the foregoing procedure, curable compositions of the following Examples were obtained:

Comparative Example 1: 50 grams mix (Silanol 5000 and Silanol 50000@50:50)

Example 1: 48.75 grams mix (Silanol 5000 and Silanol 50000@50:50)+1.25 grams of Cloisite C-15A clay Example 2: 47.5 grams mix (Silanol 5000 and Silanol 50000@50:50)+2.5 grams of Cloisite C-15A clay Example 3: 45 grams mix (Silanol 5000 and Silanol 50000@50:50)+5 grams of Cloisite C-15A clay Example 4: 45 grams mix (Silanol 5000 and Silanol 50000@50:50)+5 grams of SF ME100 clay The above-indicated blends were then used to make cured sheets as follows: PDMS-nanoclay formulations were mixed with n-propyl silicate ("NPS," a crosslinker) and solubilized dibutyl tin oxide ("DBTO," a crosslinking catalyst), as listed in Table 2, using a hand blender for 5-7 minutes with air bubbles being removed by vacuum. Each blend was poured into a Teflon sheet-forming mold and maintained for 24 hours under ambient conditions (25° C. and 50% humidity) to partially cure the PDMS components. The partially cured sheets were removed from the mold after 24 hours and maintained at ambient temperature for seven days for complete curing.

TABLE 2

Curable Compositions

|  | grams | wt % NPS | wt % DBTO |
| --- | --- | --- | --- |
| Comparative Example 1: Silanol mixture | 50 | 2 | 1.2 |
| Example 1: Silanol mixture with 2.5 wt % C-15A | 50 | 2 | 1.2 |
| Example 2: Silanol mixture with 5 wt % C-15A | 50 | 2 | 1.2 |
| Example 3: Silanol mixture with 10 wt % C-15A | 50 | 2 | 1.2 |
| Example 4: Silanol mixture with 10 wt % SF ME100 | 50 | 2 | 1.2 |

The argon permeability of the foregoing curable compositions was measured using a gas permeability set-up. The measurements were based on the variable-volume method at 100 psi pressure and at a temperature of 25° C. The permeability measurements were repeated under identical conditions 2-3 times in order to assure their reproducibility.

Figure 2:
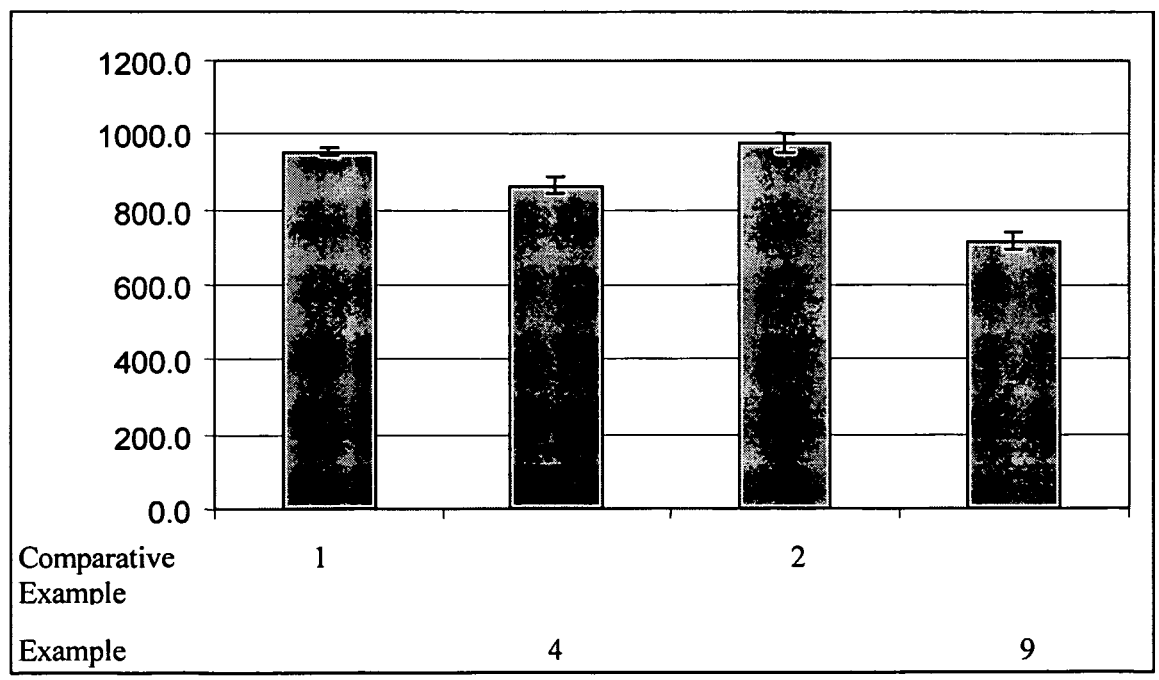
FIG. 2 is a graphic presentation of permeability data for the sealant compositions of Comparative Examples 1-2 and Examples 4 and 9.

The permeability data are graphically presented in FIGS. 1 and 2.

COMPARATIVE EXAMPLE 2 AND EXAMPLES 5-9

To provide a 1 weight percent C-15A clay (see Example 5, Table 3): 227.7 g of OMCTS (octamethylcyclotetrasiloxane) and 2.3 g of C-15A were introduced into a three-neck round bottom flask fitted with overhead stirrer and condenser. The mixture was stirred at 250 rpm for 6 hours at ambient temperature. The temperature was increased to 175° C. while stirring was continued. 0.3 g of CsOH in 1 ml of water was added to the reaction vessel through a septum. After 15 minutes, polymerization of OMCTS began and 0.5 ml of water was then added with an additional 0.5 ml of water being added after 5 minutes. Heating and stirring were continued for 1 hour after which 0.1 ml of phosphoric acid was added for neutralization. The pH of the reaction mixture was determined after 30 minutes. Stirring and heating were continued for another 30 minutes and the pH of the reaction mixture was again determined to assure complete neutralization. Distillation of cyclics was carried out at 175° C. and the mixture was thereafter cooled to room temperature.

The same procedure was followed with 2.5, 5 and 10 wt % of C-15A (see Examples 6-8, Table 3).

Similar in-situ polymerization procedures were followed with 10 wt % high aspect ratio clay (SF ME100) (see Example 9, Table 3). The in-situ polymer with different amounts of clay were then used to make cured sheets as follows: In-situ PDMS-nanoclay formulations were mixed with NPS crosslinker and solubilized DBTO catalyst using a hand blender for 5-7 min with air bubbles being removed by vacuum. The mixture was then poured into a Teflon sheet-forming mold and maintained for 24 hours under ambient conditions (25° C. and 50% humidity). The partially cured sheets were removed from the mold after 24 hours and maintained at ambient temperature for seven days for complete curing.

TABLE 3

Curable Compositions

|  | grams | wt % NPS | wt % DBTO |
| --- | --- | --- | --- |
| Comparative Example 2: Silanol mixture | 50 | 2 | 1.2 |
| Example 5: In-situ silanol with 1 wt % C-15A | 50 | 2 | 1.2 |
| Example 6: In-situ silanol with 2.5 wt % C-15A | 50 | 2 | 1.2 |
| Example 7: In-situ silanol with 5 wt % C-15A | 50 | 2 | 1.2 |
| Example 8: In-situ silanol with 10 wt % C-15A | 50 | 2 | 1.2 |
| Example 9: In-situ silanol with 10 wt % SF ME100 | 50 | 2 | 1.2 |

Argon permeability was measured using a gas permeability set-up as in the previous examples. The measurements were based on the variable-volume method at 100 psi pressure and at a temperature of 25° C. Measurements were repeated under identical conditions 2-3 times in order to assure their reproducibility.

The permeability data are graphically presented in FIGS. 1 and 2. As shown in the data, argon permeability in the case of the cured sealant compositions of the invention (Examples 1-3 and 5-8 of FIG. 1 and Examples 4 and 9 of FIG. 2) was significantly less than that of cured sealant compositions outside the scope of the invention (Comparative Examples 1 and 2 of FIGS. 1 and 2). In all, while the argon permeability coefficients of the sealant compositions of Comparative Examples 1 and 2 exceed 900 barrers, those of Examples 1-9 illustrative of sealant compositions of this invention did not exceed 900 barrers and in some cases, were well below this level of argon permeability coefficient (see, in particular, examples 3, 8 and 9).

While preferred embodiments of the present invention has been illustrated and described in detail, various modifications of, for example, components, materials and parameters, will become apparent to those skilled in the art, and it is intended to cover in the appended claims all such modifications and changes which come within the scope of this invention.

What is claimed is:

1. A curable composition comprising:
    a) at least one silanol-terminated diorganopolysiloxane;
    b) at least one alkylsilicate crosslinker having the formula:

$(R^{14}O)(R^{15}O)(R^{16}O)(R^{17}O)Si$ where $R^{14}$, $R^{15}$, $R^{16}$ and $R^{17}$ are chosen independently from monovalent $C_1$ to $C_{60}$ hydrocarbon radicals;
    c) at least one catalyst for the crosslinking reaction;
    d) at least one orcianic nanoclay; and, optionally; and
    e) at least one solid polymer having a permeability to gas that is less than the permeability of the crosslinked diorganopolysiloxane(s).

2. The composition of claim 1 wherein catalyst (c) is a tin catalyst.

3. The composition of claim 2 wherein the tin catalyst is selected from the group consisting of dibutyltindilaurate, dibutyltindiacetate, dibutyltindimethoxide, tinoctoate, isobutyltintriceroate, dibutyltinoxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates and mixtures thereof.

4. The composition of claim 1 wherein the nanoclay portion of organic nanoclay (d) is selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, kaolinite and, mixtures thereof.

5. The composition of claim 1 wherein the organic portion of organic nanoclay (d) is at least one tertiary amine compound $R^3R^4R^5N$ and/or quarternary ammonium compound $R^6R^7R^8N^+X^-$ wherein $R^3$, $R^4$, $R^5$, $R^6$, $R^7$ and $R^8$ each independently is an alkyl, alkenyl or alkoxy silane group of up to 60 carbon atoms and X is an anion.

6. The composition of claim 4 wherein the nanoclay portion of organic nanoclay (d) is modified with ammonium, primary alkylammonium, secondary alkylammonium, tertiary alkylammonium quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

7. The composition of claim 1 wherein solid polymer (e) is selected from the group consisting of low density polyethylene, very low density polyethylene, linear low density polyethylene, high density polyethylene, polypropylene, polyisobutylene, polyvinyl acetate, polyvinyl alcohol, polystyrene, polycarbonate, polyester, such as, polyethylene terephthalate, polybutylene terephthalate, polyethylene napthalate, glycol-modified polyethylene terephthalate, polyvinylchloride, polyvinylidene chloride, polyvinylidene fluoride, thermoplastic polyurethane, acrylonitrile butadiene styrene, polymethylmethacrylate, polyvinyl fluoride, polyamides, polymethylpentene, polyimide, polyetherimide, polether ether ketone, polysulfone , polyether sulfone, ethylene chlorotrifluoroethylene, polytetrafluoroethylene, cellulose acetate, cellulose acetate butyrate, plasticized polyvinyl chloride, ionomers, polyphenylene sulfide, styrene-maleic anhydride, modified polyphenylene oxide, ethylene-propylene rubber, polybutadiene, polychloroprene, polyisoprene, polyurethane, styrene-butadiene-styrene, styrene-ethylene-butadiene-styrene, polymethylphenyl siloxane and mixtures thereof.

8. The composition of claim 1 which further comprises at least one optional component selected from the group consisting of adhesion promoter, surfactant, colorant, pigment, plasticizer, filler other than organic nanoclay, antioxidant, UV stabilizer, and biocide.

9. The composition of claim 8 wherein the adhesion promoter is selected from the group consisting of n-2-aminoethyl-3-aminopropyltrimethoxysilane, 1,3,5-tris(trimethoxysilylpropyl)isocyanurate, γ-aminopropyltriethoxysilane, γ-aminopropyltrimethoxysilane, aminopropyltrimethoxysilane, bis-γ-trimethoxysilypropyl)amine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, n-ethyl-3-trimethoxysilyl-2-methylpropanamine, and mixtures thereof.

10. The composition of claim 8 wherein the surfactant is a nonionic surfactant selected from the group consisting of polyethylene glycol, polypropylene glycol, ethoxylated castor oil, oleic acid ethoxylate, alkylphenol ethoxylates, copolymers of ethylene oxide and propylene oxide and copolymers of silicones and polyethers, copolymers of silicones and copolymers of ethylene oxide and propylene oxide and mixtures thereof.

11. The composition of claim 10 wherein the non-ionic surfactant is selected from the group consisting of copolymers of ethylene oxide and propylene oxide, copolymers of silicones and polyethers, copolymers of silicones and copolymers of ethylene oxide and propylene oxide and mixtures thereof.

12. The composition of claim 8 wherein the filler other than the organic nanoclay is selected from the group consisting of calcium carbonate, precipitated calcium carbonate, colloidal calcium carbonate, calcium carbonate treated with compounds stearate or stearic acid, fumed silica, precipitated silica, silica gels, hydrophobized silicas, hydrophilic silica gels, crushed quartz, ground quartz, alumina, aluminum hydroxide, titanium hydroxide, clay, kaolin, bentonite montmorillonite, diatomaceous earth, iron oxide, carbon black and graphite, mica, talc, and mixtures thereof.

13. The cured composition of claim 1.

14. The cured composition of claim 7.

15. The cured composition of claim 8.

16. The composition of claim 13 exhibiting an argon permeability coefficient of not greater than about 900 barrers.

17. The composition of claim 14 exhibiting an argon permeability coefficient of not greater than about 900 barrers.

18. The composition of claim 15 exhibiting an argon permeability coefficient of not greater than about 900 barrers.

19. The composition of claim 1 wherein the composition is a curable sealant.

20. The composition of claim 1 wherein the composition is a cured sealant.

21. The composition of claim 13 wherein the composition is a curable sealant.

22. The composition of claim 13 wherein the composition is a cured sealant.

23. The composition of claim 9 wherein the composition is a cured adhesive.

24. The composition of claim 13 wherein the composition is a curable adhesive.

25. The composition of claim 13 wherein the composition is a cured adhesive.

* * * * *